(12) United States Patent
Shen et al.

(10) Patent No.: US 12,305,710 B2
(45) Date of Patent: May 20, 2025

(54) CREEP FREE AND INSULATED BEARING OUTER RACE CONSTRUCTION

(71) Applicant: GM Global Technology Operations LLC, Detroit, MI (US)

(72) Inventors: Peng Shen, Troy, MI (US); Wenying Yang, Rochester Hills, MI (US); Jack M. Gayney, Grosse Ile, MI (US); Xiaoqing Zeng, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 111 days.

(21) Appl. No.: 18/446,937

(22) Filed: Aug. 9, 2023

(65) Prior Publication Data

US 2025/0052280 A1 Feb. 13, 2025

(51) Int. Cl.
*F16C 33/58* (2006.01)
*F16C 35/077* (2006.01)

(52) U.S. Cl.
CPC ......... *F16C 33/583* (2013.01); *F16C 35/077* (2013.01); *F16C 2326/01* (2013.01)

(58) Field of Classification Search
CPC ............................. F16C 35/067; F16C 35/077
See application file for complete search history.

(56) References Cited

U.S. PATENT DOCUMENTS

| 4,696,587 A * | 9/1987 | Nishida ................. F16C 33/586 384/585 |
| 8,388,232 B2 * | 3/2013 | Iida ........................ F16C 27/066 277/641 |
| 2016/0195130 A1 * | 7/2016 | Moratz ................. F16C 19/527 384/582 |

FOREIGN PATENT DOCUMENTS

| JP | 2004308839 A | * | 11/2004 | ............ F16C 35/067 |
| JP | 2015072034 A | * | 4/2015 | ............ F16C 35/067 |

OTHER PUBLICATIONS

Tranaslation of JP2015072034 obtained Jan. 31, 2025.*
Hexpol Compounding, "ACM Rubber", 2024.*

* cited by examiner

*Primary Examiner* — James Pilkington
(74) *Attorney, Agent, or Firm* — Vivacqua Crane, PLLC

(57) ABSTRACT

A bearing outer face construction system includes a bearing having a bearing outer race. The bearing outer race includes an outer race surface. At least one circumferential groove is recessed into the bearing outer race. An expanding member is received in the at least one circumferential groove. A housing receives the bearing having a gap between a housing inner face and the bearing outer race. The expanding member expands to radially extend across the gap into direct contact with the housing inner face to mitigate against motion between the bearing and the housing inner face.

20 Claims, 1 Drawing Sheet

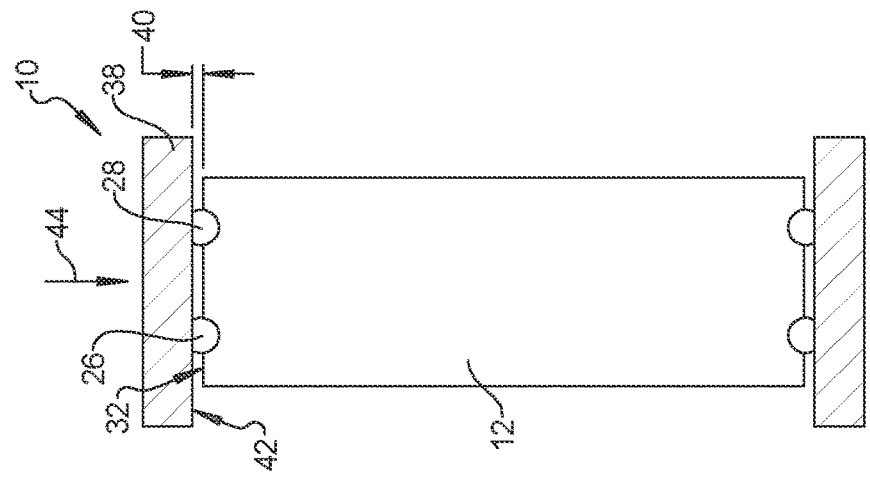
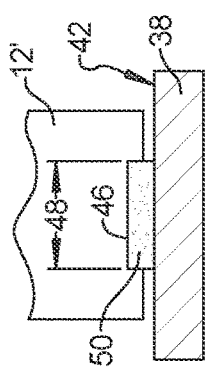
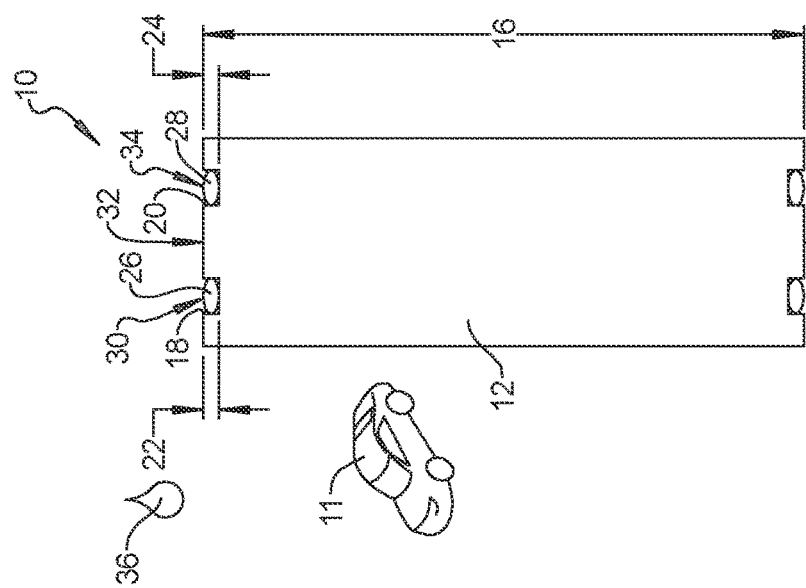

CREEP FREE AND INSULATED BEARING OUTER RACE CONSTRUCTION

INTRODUCTION

The present disclosure relates to vehicle bearing assemblies.

Vehicle bearing assemblies for vehicles including but not limited to automobiles, trucks, vans, sport utility vehicles, autonomous vehicles, battery electric vehicles, farm or construction equipment, railway vehicles and the like may include a bearing which is slidably fit into a housing, with a sliding fit between the bearing and the housing. The sliding fit is intended to mitigate against rotation or motion of the bearing due to rotational forces induced by for example a rotating shaft passing through and rotatably supported by the bearing. Unintended motion of the bearing may cause wear between the bearing and the housing and or misalignment of the bearing resulting in subsequent wear on a shaft passing through the bearing or wear on interconnected gears.

Electrical current generated by induction during operation of an electrical motor may pass through metal-to-metal contacting elements of the bearing to the housing. This may impede bearing function over time, which also may create subsequent misalignment of the bearing.

Thus, while systems and methods to assemble bearings in a housing using a slip fit achieve their intended purpose, there is a need for a new and improved system and method to construct bearing faces.

SUMMARY

According to several aspects, a vehicle bearing outer face construction system includes a bearing having a bearing outer race. The bearing outer race includes an outer race surface. At least one circumferential groove is recessed into the bearing outer race. An expanding member is received in the at least one circumferential groove. A housing receives the bearing having a gap between a housing inner face and the bearing outer race. The expanding member expands to radially extend across the gap into direct contact with the housing inner face to mitigate against motion between the bearing and the housing inner face.

In another aspect of the present disclosure, the expanding member defines an elastomeric rubber.

In another aspect of the present disclosure, a liquid applied one of into the at least one circumferential groove prior to installation of the expanding member or applied onto the expanding member during or after receiving the expanding member initiates radial expansion of the expanding member to extend the expanding member outward of the at least one circumferential groove.

In another aspect of the present disclosure, the liquid defines one of a petroleum-based liquid or a solvent-based liquid, with the liquid being compatible with an application environment.

In another aspect of the present disclosure, a friction force is created by direct contact between the expanding member and the housing inner face.

In another aspect of the present disclosure, the expanding member defines an expanding foam, the expanding foam received in the at least one circumferential groove and expanding to extend across the gap upon installation of the expanding foam.

In another aspect of the present disclosure, the expanding member is positioned entirely within the at least one circumferential groove and even with or recessed with respect to the outer race surface prior to the expanding member expanding.

In another aspect of the present disclosure, the at least one circumferential groove defines a first circumferential groove and a second circumferential groove. The expanding member defines a first expanding member received in the first circumferential groove and a second expanding member received in the second circumferential groove.

In another aspect of the present disclosure, a material of the expanding member includes an impedance mitigating against an electrical current passing between the bearing and the housing.

In another aspect of the present disclosure, the at least one circumferential groove defines a first circumferential groove and a second circumferential groove, the first circumferential groove and the second circumferential groove individually defining a common circumferential groove width According to several aspects, a bearing outer face construction system includes a bearing having a bearing outer race. At least one circumferential groove is recessed into the bearing outer race. An expanding member of an elastomeric rubber is received in the at least one circumferential groove and having an impedance. A housing has a housing inner face, the housing receiving the bearing having a gap remaining between the housing inner face and the bearing outer race. The expanding member expands to radially extend across the gap into direct contact with the housing inner face to mitigate against motion between the bearing and the housing inner face. The impedance mitigates against an electrical current passing between the bearing and the housing.

In another aspect of the present disclosure, the expanding member expands when contacted by a liquid.

In another aspect of the present disclosure, the liquid is positioned within the at least one circumferential groove prior to receipt of the expanding member.

In another aspect of the present disclosure, the liquid is applied onto the expanding member after installation of the expanding member into the at least one circumferential groove.

In another aspect of the present disclosure, the at least one circumferential groove defines a first circumferential groove and a second circumferential groove. The expanding member defines a first expanding member received in the first circumferential groove and a second expanding member received in the second circumferential groove.

In another aspect of the present disclosure, the expanding member has a temperature rating of at least 150° C.

In another aspect of the present disclosure, the gap between the housing inner face and the bearing outer race has a nominal range between approximately 10 microns up to approximately 20 microns with the bearing and the housing at room temperature, with the gap increasing to approximately 30 microns up to approximately 50 microns when the bearing and the housing are at a system operating temperature.

According to several aspects, a method to construct a bearing outer face comprises: creating a bearing having a bearing outer race including an outer race surface; recessing at least one circumferential groove into the bearing outer race; positioning an expanding member in the at least one circumferential groove; and installing the bearing into a housing having a gap between a housing inner face and the bearing outer race, inducing expansion of the expanding member to radially extend across the gap into direct contact with the housing inner face to mitigate against motion between the bearing and the housing inner face.

In another aspect of the present disclosure, the method includes generating a friction force between the outer race surface of the bearing outer race and the housing inner surface of the housing by partial compression of the expanding member.

In another aspect of the present disclosure, the method includes selecting a material of the expanding member to provide an impedance, the impedance mitigating against an electrical current passing between the bearing and the housing.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 1 is a side elevational view of a bearing according to an exemplary aspect;

FIG. 2 is a side elevational partial cross sectional view of the bearing of FIG. 1 installed within a housing; and FIG. 3 is a partial side elevational partial cross-sectional view of a modified bearing installed within the housing.

DETAILED DESCRIPTION

The following description is merely exemplary in nature and is not intended to limit the present disclosure, application, or uses.

When a component, element or layer is referred to as being "on", "engaged to", "connected to", or "coupled to" another element or layer, it may be directly on, engaged, connected or coupled to the other component, element, or layer, or intervening elements or layers may be present. In contrast, when an element is referred to as being "directly on", "directly engaged to", "directly connected to", or "directly coupled to" another element or layer, there may be no intervening elements or layers present. Other words used to describe the relationship between elements should be interpreted in a like fashion, such as "between" versus "directly between", "adjacent" versus "directly adjacent", and the like. As used herein, the term "and/or" includes any and all combinations of one or more of the associated listed items.

Referring to FIG. 1, a vehicle bearing outer face construction system 10 for use in a bearing system of a vehicle 11 includes a bearing 12 having a bearing outer race 14 and having a bearing outside diameter (OD) 16. As noted herein, vehicle 11 may include but is not limited to automobiles, trucks, vans, sport utility vehicles, autonomous vehicles, battery electric vehicles, farm or construction equipment, railway vehicles and the like. The bearing outer race 14 includes a first circumferential groove 18 recessed into the bearing outer race 14 and a second circumferential groove 20 also recessed into the bearing outer race 14. According to several aspects a first depth 22 of the first circumferential groove 18 is substantially equal to a second depth 24 of the second circumferential groove 20. A first expanding member 26 is pre-positioned in the first circumferential groove 18 and a second expanding member 28 is pre-positioned in the second circumferential groove 20. When in a first pre-positioned condition, a first outer facing surface 30 of the first expanding member 26 is substantially flush or even with an outer race surface 32 of the bearing outer race 14 and a second outer facing surface 34 of the second expanding member 28 is also substantially flush or even with the outer race surface 32 of the bearing outer race 14.

According to further aspects, the first depth 22 of the first circumferential groove 18 may differ from the second depth 24 of the second circumferential groove 20. This difference may allow for different sizes of expanding members and different bearing geometries.

Alternatively, according to several aspects when in a second pre-positioned condition, the first outer facing surface 30 of the first expanding member 26 and the second outer facing surface 34 of the second expanding member 28 are recessed below the outer race surface 32 of the bearing outer race 14. In the second pre-positioned condition the first expanding member 26 therefore is smaller than the outside diameter 16 of the bearing outer race 14. In the second pre-positioned condition the second outer facing surface 34 of the second expanding member 28 is also recessed below the outer race surface 32 of the bearing outer race 14 and therefore is smaller than the outside diameter 16 of the bearing outer race 14.

According to several aspects a material of the first expanding member 26 and a material of the second expandable member 26 is an elastomer rubber compound with acceptable hardness after swelling. According to several aspects the elastomer rubber compound may be VAMAC® G with a minimum 75 Shore A hardness. According to several aspects a material of the first expanding member 26 and a material of the second expandable member 28 is a foam material which expands upon entrance into individual ones of the circumferential grooves such as by expansion from a compressed state, or which expands upon subsequent application of a fluid.

With continuing reference to FIG. 1, according to several aspects, after installation of the first expanding member 26 and the second expanding member 28 into the grooves of the bearing outer race 14 a liquid 36 is applied onto the first expanding member 26 and onto the second expanding member 28. Application of the liquid 36 may be performed by syringe application, by dipping the expanding members into the liquid 36 or by spraying. The liquid may be a petroleum-based fluid, such as: automatic transmission fluid (ATF); Petro-Lube Inc, NP-371; or Texaco Electrical Testing Laboratories (ETL) 7292 Europa. The liquid 36 may also define a solvent-based liquid, with the liquid 36 being compatible with an application environment.

One purpose of the liquid 36 is to cause material expansion of the first expanding member 26 and the second expanding member 28 to stand above the outer race surface 32 of the bearing outer race 14.

Alternatively, the liquid 36 may be supplied into the first circumferential groove 18 and into the second circumferential groove 20 prior to installation of the first expanding member 26 and the second expanding member 28. This approach permits the first expanding member 26 and the second expanding member 28 to begin absorption of the liquid 36 and therefore to begin immediate expansion upon installation of the first expanding member 26 and the second expanding member 28.

Referring to FIG. 2 and again to FIG. 1, the bearing 12 having the first expanding member 26 and the second expanding member 28 installed is slidably assembled into a housing 38. A gap 40 that is present between the outer race surface 32 of the bearing outer race 14 and a housing inner surface 42 of the housing 38 allows for a slip fit between the outer race surface 32 and the bearing outer race 14 during bearing installation. The first expanding member 26 and the second expanding member 28 are flexible to facilitate a sliding assembly process of the bearing 12 into the housing 38. The gap 40 is filled by elastic expansion of the first expanding member 26 and the second expanding member 28. As noted above the liquid 36 may be applied within the first circumferential groove 18 and the second circumferential groove 20 prior to assembly of the bearing 12 into the housing 38 or onto the first expanding member 26 and the second expanding member 28 prior to or after assembly of the bearing 12. Radial expansion of the first expanding member 26 and the second expanding member 28 occurs by absorption of the liquid 36 to close the gap 40.

Referring to FIG. 3 and again to FIGS. 1 and 2, according to further aspects, the first circumferential groove 18 and the second circumferential groove 20 may be replaced with a single groove 46 of a modified bearing 12' having a single groove width 48 equal to or greater than a width of the first circumferential groove 18 and/or the second circumferential groove 20. The single groove 46 may allow a wider and therefore a greater surface area of contact between an expanding member 50 inserted into the single groove 46 and the housing inner surface 42 of the housing 38.

The designs of the bearing 12 and the modified bearing 12' of the present disclosure apply insulating material properties of one or more expanding members to electrically insulate the bearing 12 or the modified bearing 12' from the housing 38 and mitigate against electrical current passage to the bearing 12 or the modified bearing 12', therefore mitigating a risk of pre-mature drive unit failure. In addition to the electrical insulation benefit, after expansion of the first expanding member 26 and the second expanding member 28 by absorption of the liquid 36, a friction force 44 is generated between the outer race surface 32 of the bearing outer race 14 and the housing inner surface 42 of the housing 38 by partial compression of the first expanding member 26 and the second expanding member 28 which mitigates against slippage between the outer race surface 32 of the bearing outer race 14 and the housing inner surface 42 of the housing 38. Mitigation against slippage helps to eliminate bearing creep, which otherwise may occur when a relative slippage occurs between the outer race surface 32 of the bearing outer race 14 and the housing inner surface 42. Occurrence of creep may lead to pre-mature drive unit and transmission failure such as when the bearing 12 or the modified bearing 12' is used in a drive unit or a transmission of a vehicle 11.

According to several aspects, the material of the expansion members including the first expanding member 26 and the second expanding member 28 have a minimum temperature rating of approximately 150° C. According to several aspects, the gap 40 between the outer race surface 32 and the housing inner surface 42 has a nominal range between approximately 10 microns up to approximately 20 microns with the bearing 12 and the housing 38 at room temperature and increasing to approximately 30 microns up to approximately 50 microns when the bearing 12 and the housing 38 are at a system operating temperature. The materials of the expanding members are therefore selected to provide direct contact with the housing inner surface 42 over an assembly temperature ranging at least between approximately 10 microns up to approximately 50 microns.

The vehicle bearing outer face construction system 10 of the present disclosure provides a bearing outer race with one or multiple grooves having an expanding rubber or foam material in individual ones of the grooves. The outside diameter 16 of the bearing 12 and the modified bearing 12' is equivalent to or smaller than the OD 16 of the bearing 12 prior to swelling from oil absorption or expansion of a foam material of the expanding member. The vehicle bearing outer face construction system 10 of the present disclosure provides a combination use of an elastomer material(s) with absorption of a fluid(s) or by self-expansion of the expanding members for example using an expanding foam material. The first expanding member 26 and the second expanding member 28 generate friction force 44 between the bearing outer race surface 32 and the housing inner surface 42 which mitigates against bearing slippage.

A vehicle bearing outer face construction system 10 of the present disclosure offers several advantages. These include the use of the expanding members to eliminate creep caused by relative slippage between a bearing outer race surface and a housing inner surface, without impacting the efficiency of a bearing assembly manufacturing process. The use of a combination of elastomer material(s) with a suitable fluid(s) to initiate expansion of the expending member generates a friction force between a bearing outer race and a housing bore surface to prevent slippage. The vehicle bearing outer face construction system 10 of the present disclosure provides a manufacturing friendly design having minimized complexity. The vehicle bearing outer face construction system 10 of the present disclosure also provides an effective and less expensive bearing electrical insulation.

The vehicle bearing outer face construction system 10 of the present disclosure helps to eliminate creep, which occurs when a relative slippage occurs between a bearing outer surface and a housing inner surface. Creep may otherwise lead to gear wear, pre-mature drive unit and transmission failure. The vehicle bearing outer face construction system 10 of the present disclosure insulates the bearing and ensures a high impedance of the bearing, thus a current does seek ground through the bearing, instead the current will pass through an appropriate path such as via grounded elements outside of the housing.

What is claimed is:

1. A vehicle bearing system, comprising:
   a bearing having a bearing outer race, the bearing outer race including an outer race surface;
   at least one circumferential groove recessed into the bearing outer race;
   an expanding member received in the at least one circumferential groove, wherein the expanding member defines an elastomeric rubber;
   a housing receiving the bearing having a gap between a housing inner face and the bearing outer race, the expanding member expanding to radially extend across the gap into direct contact with the housing inner face to mitigate against motion between the bearing and the housing inner face; and
   a liquid applied to one of the at least one circumferential groove prior to installation of the expanding member or applied onto the expanding member during or after receiving the expanding member, wherein the liquid initiates radial expansion of the expanding member to extend the expanding member outward of the at least one circumferential groove.

2. The vehicle bearing system of claim 1, wherein the liquid comprises one of a petroleum-based liquid or a solvent-based liquid.

3. The vehicle bearing system of claim 1, further including a friction force created by direct contact between the expanding member and the housing inner face.

4. The vehicle bearing system of claim 1, wherein the expanding member defines an expanding foam, the expanding foam received in the at least one circumferential groove and expanding to extend across the gap upon installation of the expanding foam.

5. The vehicle bearing system of claim 1, wherein the expanding member is positioned entirely within the at least one circumferential groove and even with or recessed with respect to the outer race surface prior to the expanding member expanding.

6. The vehicle bearing system of claim 1, wherein:
the at least one circumferential groove defines a first circumferential groove and a second circumferential groove; and
the expanding member defines a first expanding member received in the first circumferential groove and a second expanding member received in the second circumferential groove.

7. The vehicle bearing system of claim 1, wherein a material of the expanding member includes an impedance mitigating against an electrical current passing between the bearing and the housing.

8. The vehicle bearing system of claim 1, wherein the at least one circumferential groove defines a first circumferential groove and a second circumferential groove, the first circumferential groove and the second circumferential groove having a common groove width.

9. The vehicle bearing system of claim 1, wherein the at least one circumferential groove has a first depth and a second depth that differ from each other, allowing for different expansion characteristics in different regions of the groove.

10. The vehicle bearing system of claim 1, wherein the expanding member is configured to electrically insulate the bearing from the housing to mitigate against electrical current passing through the bearing.

11. The vehicle bearing system of claim 1, wherein the expanding member is formed from an elastomer rubber compound having a minimum hardness of 75 Shore A after swelling.

12. A bearing system, comprising:
a bearing having a bearing outer race;
at least one circumferential groove recessed into the bearing outer race;
an expanding member of an elastomeric rubber and having an impedance received in the at least one circumferential groove, wherein the expanding member expands when contacted by a liquid; and
a housing having a housing inner face, the housing receiving the bearing having a gap remaining between the housing inner face and the bearing outer race, the expanding member expanding to radially extend across the gap into direct contact with the housing inner face to mitigate against motion between the bearing and the housing inner face, and wherein the impedance mitigates against an electrical current passing between the bearing and the housing.

13. The bearing system of claim 12, wherein the liquid is positioned within the at least one circumferential groove prior to receipt of the expanding member.

14. The bearing system of claim 12, wherein the liquid is applied onto the expanding member after installation of the expanding member into the at least one circumferential groove.

15. The bearing system of claim 12, wherein the bearing outer race includes an outer race surface, with the expanding member when positioned within the at least one circumferential groove located even with or below the outer race surface to facilitate sliding the bearing into the housing.

16. The bearing system of claim 12, wherein the expanding member has a temperature rating of at least 150° C.

17. The bearing system of claim 12, wherein the gap between the housing inner face and the bearing outer race has a nominal range between approximately 10 microns up to approximately 20 microns with the bearing and the housing at room temperature, with the gap increasing to approximately 30 microns up to approximately 50 microns when the bearing and the housing are at a system operating temperature.

18. A method to construct a bearing system, comprising:
creating a bearing having a bearing outer race including an outer race surface;
recessing at least one circumferential groove into the bearing outer race;
positioning an expanding member in the at least one circumferential groove;
installing the bearing into a housing having a gap between a housing inner face and the bearing outer race; and
inducing expansion of the expanding member to radially extend across the gap into direct contact with the housing inner face to mitigate against motion between the bearing and the housing inner face.

19. The method of claim 18, further including generating a friction force between the outer race surface of the bearing outer race and the housing inner face of the housing by partial compression of the expanding member.

20. The method of claim 18, further including selecting a material of the expanding member to provide an impedance, the impedance mitigating against an electrical current passing between the bearing and the housing.

* * * * *